March 25, 1969 D. W. B. MUIR 3,435,443

FLUX SENSITIVE TRANSDUCER WITH TUNED RESONANT CIRCUIT

Original Filed June 25, 1964

INVENTOR
Douglas W.B. Muir
By Watson, Cole, Grindle & Watson
ATTORNEYS

United States Patent Office 3,435,443
Patented Mar. 25, 1969

3,435,443
FLUX SENSITIVE TRANSDUCER WITH TUNED RESONANT CIRCUIT

Douglas William Ballantyne Muir, London, England, assignor to The Molins Organisation Limited, London, England, a corporation of Great Britain Continuation of application Ser. No. 377,951, June 25, 1964. This application Mar. 22, 1968, Ser. No. 715,466
Int. Cl. G11b 5/30
U.S. Cl. 340—174.1 9 Claims

ABSTRACT OF THE DISCLOSURE

A reading head for magnetic data storage devices comprises a gapped core carrying a winding serving as part of a tuned circuit and is also supplied with a D.C. induced biasing flux in the core at such a level that when a magnetized storage element is in the gap the sense of magnetization thereof determines whether the core is saturated and hence whether the tuned circuit is in resonance with an applied A.C. signal, a substantial A.C. voltage appearing across said winding at resonance.

This application is a continuation of application Ser. No. 377,951 which is now abandoned.

This invention relates to magnetic data storage devices and reading heads therefor.

In recent years the advent of electronic computers and like machines has led to the development of numerous forms of data storage devices, often termed "memory" devices, but the emphasis has almost invariably been on high operating speed as the cost of such machines is such that their operation is not economic at low speeds. Many of the storage devices developed have included delay lines or the like, the data being circulated round a closed loop in the form of a sequence of electric pulses, but devices of this type are basically unsatisfactory for permanent or long-term storage as the stored data is lost whenever there is an interruption in the power supply for the device. Permanent or long-term storage without the need for an uninterrupted power supply is achieved with various magnetic storage devices, i.e., tapes, drums, discs and core matrices, but at quite large initial cost. This cost is moreover increased by the fact that in most instances only very small output signals can be obtained, so that output amplifiers must be provided.

It is an object of the present invention to provide a simple and relatively cheap data storage device, suitable for permanent or long-term storage and able to deliver relatively large output signals.

According to the invention we provide a data storage device comprising a plurality of discrete magnetisable elements supported by a non-magnetisable carrier member and head means adjacent said carrier member for magnetising any selected one of said elements and for detecting the magnetic state of any selected one of said elements, said carrier member being movable relative to said head means to permit any selected one of said elements to be brought into such juxtaposition with said head means as to permit magnetic interaction between the one selected element and the head means.

It is preferred that the elements should always be magnetised in one sense or the other and that data should be stored in a binary-coded form, i.e., that magnetisation of an element in one sense should represent a stored binary digit "0" while magnetisation in the opposite sense represents a stored binary digit "1." However, if desired data may be stored in a ternary-coded form, utilising lack of magnetisation of each element as a third digital value representation.

The carrier member is preferably a rotatable non-metallic disc and the elements may then be short bars carried at spaced positions on or embedded in the periphery of the disc with their longitudinal axes lying parallel to its axis of rotation. The head means may then be fixedly mounted adjacent the periphery of the disc.

It is preferred that the head means should include separate recording and reading heads and where the elements are short bars, each head may include a U-shaped core with a gap at its open end slightly larger than the length of an element so that whenever one of the elements is placed lengthwise across said gap it substantially fills the gap in the magnetic circuit of the core.

The use of discrete elements makes it practicable to record in and read from a selected element while the latter is stationary or moving only slowly past the head means, as compared with the need for relative motion at substantial speed with a conventional magnetic drum having a continuous magnetisable coating of which elementary areas serve as separate storage elements. This facility of reading from a stationary or slow-moving element is possible because the core of the reading head may be made of such dimensions as to be brought at least substantially to saturation when a magnetised element bridges its gap; therefore if for example the core of the reading head carries two windings, one of which is fed with an A.C. signal and the other used as an output winding, the latter will deliver an output A.C. signal when no magnetised element is adjacent the head but a series of positive or negative half-waves when a magnetised element adjacent the head produces substantial saturation of its core, the polarity of such half-waves being governed by the direction of magnetisation of the element. While the A.C. signal applied to the one winding must not be large if demagnetisation of the element from which data is being read is to be avoided, this requirement is not so severe as to prevent the output half-waves being of reasonable amplitude, favourably comparable with the signals obtained from conventional drums or tapes run at relatively high speeds.

An alternative and preferred arrangement for reading stored data involves the use of a reading head unit embodying further features of the invention. According to the invention, therefore, there is also provided a reading head unit for a magnetic data-storage device in which data is stored by selective magnetisation of discrete storage elements, said head unit comprising a core having a gap so shaped and dimensioned as to be substantially closed whenever one of said storage elements is placed therein, a winding on said core, capacitor means connected to said winding to form a tuned circuit resonant at a predetermined frequency whenever said core is unsaturated, means for supplying a direct current to said winding to produce a biasing flux in said core in the absence of any storage element in said gap, and means for supplying to said winding an alternating current of said predetermined frequency so that a substantial A.C. voltage appears across said winding whenever said core is unsaturated, said biasing flux being of such magnitude that whenever a magnetised storage element is present in said gap the sense of magnetisation of said element determines whether or not said core is saturated.

It is preferred to arrange the direct current supplying means to energize the winding sufficiently for the biasing flux to saturate the core.

With such a unit, a substantial output signal is obtained, as the tuned circuit is effective to increase the voltage across the winding whenever the core is unsaturated, but ineffective in this regard when the core is saturated due to the different inductance of the winding which of course makes the resonant frequency different. In trials it has been found that when the voltage across the winding is 0.5 volt while the core remains saturated, it may rise to 20 volts when the presence of a storage element in the gap removes the saturation.

The use of A.C. signals in the reading head in the ways suggested above assists materially in avoiding faulty operation due to magnetic remanence effects in the reading head core.

In order that the invention may be fully understood, a more detailed description will now be given of various forms of apparatus embodying the invention. Reference will be made to the accompanying drawings, in which.

Figure 1:
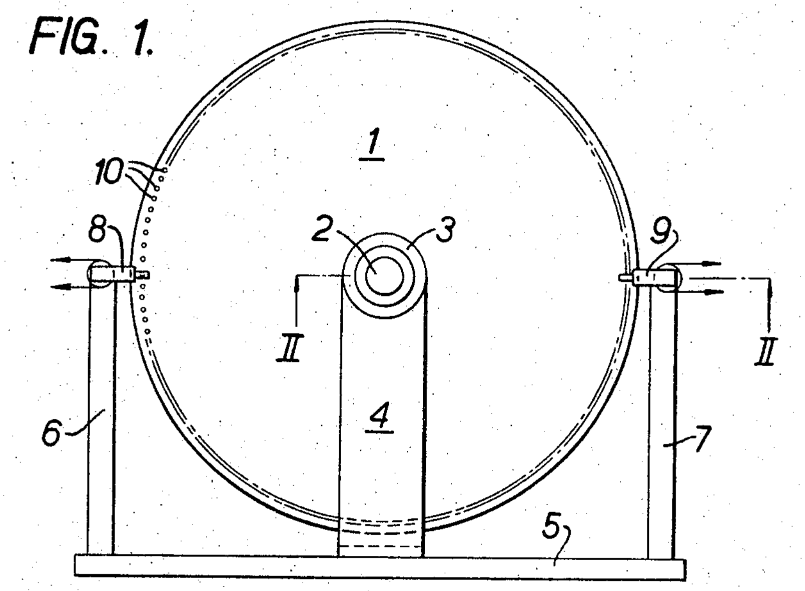
FIGURE 1 is an end elevation of a storage device embodying the invention.
Figure 2:
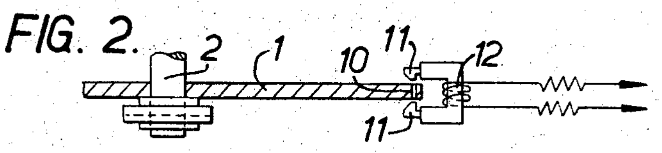
FIGURE 2 is a cross-sectional view of the same device, the section being in a plane indicated by line II—II of FIGURE 1.

First considering FIGURES 1 and 2, the device shown comprises a disc 1 of non-magnetic material, preferably also being an electrical insulator, carried by a central shaft 2 rotatable in journals 3, which in turn are supported by brackets 4 upon a base 5. Further brackets 6, 7 also mounted on the base 5 respectively support a recording head 8 and a reading head 9 adacent the periphery of the disc 1 at diametrically opposed positions.

Within the disc 1 are embedded a plurality of short pins 10, having their axes parallel to that of the shaft 2 and each of length equal to the thickness of the disc 1 so that their ends are flush with the surfaces of the disc; pins 10 are made of a magnetisable material having the properties of high remanence and low coercive force. The pins 10 are regularly spaced around the peripheral portion of the disc 1 and all equidistant from shaft 2.

Figure 3:
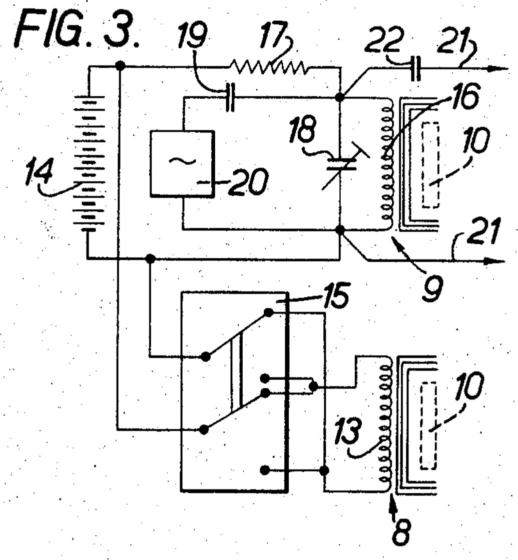
FIGURE 3 is a schematic diagram of electrical circuits associated with the device of FIGURES 1 and 2.

The two heads 8, 9 each comprise a winding, to be discussed further in connection with FIGURE 3, carried on a core. As seen in FIGURE 2, the core is of U-form, having two legs 11 extending on either side of the peripheral portion of the disc 1 and a bridge-piece 12 uniting said legs and carrying a winding 13. The spacing between the tips of the core legs 11 is only very slightly greater than the thickness of the disc 1 (and therefore the length of each pin 10), so that when a pin 10 lies between the tips of the core the clearance between each core tip and the adjoining end of the pin 10 is as small as possible, and thus a pin 10 in this position becomes a part of the magnetic circuit of the core; with the pin in this position said magnetic circuit is of very low reluctance while such reluctance is high when no pin 10 lies between the core tips 11 as there is then a large air gap in the magnetic circuit.

Now turning to FIGURE 3, the recording head 8 and reading head 9 are shown with their associated circuits. Said recording head has its winding 13 connected to a D.C. source, shown as battery 14, via a control unit schematically represented as a reversing switch 15. Whenever a pin 10 lies between the tips of the core of recording head 9, it is subjected to a magnetic field sufficient to magnetise the pin, the direction of magnetisation depending on the sense of the field which in turn is governed by the position of switch 15. It will be understood that battery 14 and switch 15 represent any form of control device capable of causing a suitable current to pass through the winding 13 in either direction as required, so that each pin 10 when it lies between the core tips of head 8 may be magnetised in one direction, to represent a stored binary digit "1," or the opposite direction, to represent a stored binary digit "0."

Reading head 9 has more involved circuits associated with it. First, however, this head has its winding 16 connected to the D.C. source, battery 14, via a current-limiting resistor 17, so that the core of the reading head, due to a D.C. biasing current in winding 16, is always subject to a steady biasing magnetic flux.

A capacitor 18, conveniently of the preset type shown, is connected in shunt with winding 16 and the tuned circuit thus formed is connected via a D.C. isolating capacitor 19 to the output of an A.C. source 20, e.g. an oscillator, of high output impedance.

The steady biasing flux in the core of head 9 is just sufficient to saturate said core when no pin 10 lies between the tips of the core; if a pin 10 which is unmagnetised, or is magnetised in such a direction as not to oppose said biasing flux, is brought between the core tips, no material change in the condition of the core occurs. In each case the total flux in the core increases, but as the core was previously saturated, the change is not noteworthy and the inductance of the winding 16 not materially affected, if at all.

When however a pin 10 magnetised in a direction to opose the biasing flux is brought between the core tips, the core ceases to be saturated and the inductance of winding 16 consequently increases materially. The frequency of A.C. generator 20 and the value of capacitor 18 are so chosen that the tuned circuit 18, 16 is now in resonance at the generator frequency, hence the A.C. voltage across the winding 16 rises to a much higher value, the ratio of increase depending on the "Q" of the tuned circuit. This A.C. voltage is applied to output leads 21, one of which contains a D.C. isolating capacitor 22, and may be utilised as required.

It will be seen that a simple but effective storage device has been provided, suitable for use in a variety of applications while being relatively inexpensive.

Various changes or modifications in the specific details set out above may be made without departing from the scope of the invention. Thus if desired an erase head may be provided if required; such a head could be structurally similar to the recording head but need only be constantly energised with D.C. so as to bring all the pins to one predetermined magnetic state, e.g., the "0" representing state.

In some uses, it may be of advantage to provide more than one recording head. One example of this can be found in the application of such a storage device to productive machines e.g. cigarette-making machines, where at different stages of manufacture various tests or measurements are made on the articles produced, and it is desired to reject finished articles containing faults revealed by those tests or measurements. In such cases the problem arises that each article produced undergoes the several tests or measurements at different times and is available for rejection, at the output end of the machine, at some time later than the time of the last test or measurement. If a device embodying the invention is employed, it may have its disc 1 driven in synchronism with the productive machine, and have a separate recording head for each test or measurement; the spacing of the recording heads is such that as any one article undergoes each successive test or measurement one of the pins 10 corresponding to that article is at the recording head corresponding to that test or measurement. The recording head for each test or measurement is energised to record a "1," say, in the pin 10 if the article under the corresponding test fails to pass, thus as each article reaches the output of the machine the corresponding pin 10 will be in the "1" state if that article has failed to pass any one or more of the tests or measurements. The reading head of the device is so positioned that as each article reaches the machine output, the corresponding pin 10 is at the reading head and therefore a "1" output signal from the latter, which will indicate an unsatisfactory article, may be used to cause rejection of that article. A device so used will of course be provided with an erase head arranged to put all the pins in the "0" state shortly after they pass the reading head.

The operation of the reading head may be modified by reducing the D.C. bias applied to it, so that the magnetic flux in the core of the reading head is of the order of one-half that required for saturation. In this condition, the tuned circuit will be in resonance with the applied oscillations when no pin lies in the gap of the reading head core. When a pin magnetised in the same sense as the biasing flux in the core enters the gap, the core saturates and the A.C. voltage across the winding on the core drops as the tuned circuit goes out of resonance but if a pin oppositely magnetised enters the gap, there is some cancellation of the biasing flux but the tuned circuit remains in resonance. With such a reading arrangement it has been found that enhanced sensitivity can be achieved.

Furthermore, if desired a combined reading/writing head assembly may be employed. Such an assembly may comprise two cores arranged in side-by-side relation with the tips of their pole-pieces very close together, one core being of substantial section to pass a relatively large magnetic flux for writing and the other core being of small section permitting ready saturation by magnetic flux of a smaller magnitude for reading. Allowance of course has to be made for the magnetic shunting effect each core has upon the other, and use may be made of this effect in that the writing core may be magnetised during a reading operation so as to produce required biasing flux in the reading core.

Lastly, it may be noted that, while in the device above described a single pin is brought to the writing or reading head at any instant, so that only a single biasing digit is recorded or read at a time, such devices may be employed in groups, e.g. mounted on a common shaft, for storage of multi-digit numbers, and a plurality of such devices operating in concert may serve as an "addressable" store containing a substantial block of data at each address. If combined reading/writing head assemblies are employed in such groups of devices, then whenever data is read from a particular address the contents of the part of the store indicated by that address may immediately be modified or completely replaced if desired. Such a store therefore is especially convenient for manually-controlled writing and reading.

What I claim is:

1. In an improved magnetic data storage apparatus comprising head means, a non-magnetizable carrier member movably mounted adjacent said head means, a plurality of discrete magnetizable elements supported by said carrier member, said head means including recording head means and reading head means, said head means each further including a core having a gap shaped and dimensioned to be substantially closed whenever one of said storage elements is positioned therein by movement of said carrier member, the recording head means including means for selective magnetization of storage elements positioned in said recording means core gap, said reading head means including a winding on its core, the improvement consisting of reactive means connected to said winding to form a tuned circuit resonant at a predetermined frequency whenever said reading core is unsaturated, means for biasing said reading core to produce a biasing flux therein, means for supplying a signal of said predetermined frequency to said winding to generate a substantial signal across said winding only when said reading core is unsaturated and, wherein the unsaturation of said reading core is determined by the direction of the selective magnetization of said storage element present in said reading core gap.

2. An improved magnetic data storage apparatus according to claim 1 wherein the means for biasing said reading core produces a biasing flux therein to saturate the core.

3. An improved magnetic data storage apparatus according to claim 2 wherein the reactive means is connected with said winding to form a parallel resonant circuit.

4. An improved magnetic data storage apparatus according to claim 3 wherein the reactive means is a capacitor.

5. Reading head apparatus for determining the bi-directional magnetic state of data storage elements wherein data is stored by selective magnetization, said reading head comprising;

core means capable of being placed in a saturated or unsaturated magnetic state, said core means including a nonmagnetic gap, sensing means responsive to the magnetic state of said core means for determining the directional magnetic state of the data storage elements, reactance means operatively associated with the sensing means to form a tuned circuit resonant at a predetermined frequency, biasing means for producing a biasing flux in said core means, means for energizing said sensing means and said reactance means with a signal having said predetermined frequency, said sensing means only providing a substantial signal of said predetermined frequency when said core is unsaturated, and the magnetic state of said core means being dependent on the sense of the bi-directional magnetic state of the data storage element present in said core gap.

6. Reading head apparatus according to claim 5 wherein the biasing flux saturates said core.

7. Reading head apparatus according to claim 5 wherein the biasing flux has a magnitude which conditions said core in an unsaturated state, said magnitude being such that the presence in said core gap of a data storage element having a magnetization in the same sense of said biasing flux saturates said core and the presence in said core gap of a data storage element having a magnetization in the opposite sense of said biasing flux causes said core to remain unsaturated.

8. A reading head apparatus according to claim 5 wherein said reactance means is connected in parallel with said sensing means to form a parallel tuned resonant circuit.

9. A reading head apparatus according to claim 8 wherein said sensing means consists of a winding and said reactance means consists of a capacitance.

References Cited

UNITED STATES PATENTS

| | | | |
|---|---|---|---|
| 2,875,429 | 2/1959 | Quade | 340—174.1 |
| 3,049,697 | 8/1962 | Slattery et al. | 340—174.1 |
| 3,164,684 | 1/1965 | Wiegand | 179—100.2 |
| 2,722,569 | 11/1955 | Loper | 179—100.2 |
| 3,246,219 | 4/1966 | Devol et al. | 340—174.1 |

BERNARD KONICK, *Primary Examiner.*

VINCENT P. CANNEY, *Assistant Examiner.*

U.S. Cl. X.R.

179—100.2